United States Patent [19]

Amberntson

[11] Patent Number: 5,315,888
[45] Date of Patent: May 31, 1994

[54] GYRO NUTATION DAMPER

[75] Inventor: David S. Amberntson, Orlando, Fla.

[73] Assignee: Martin Marietta Corporation, Bethesda, Md.

[21] Appl. No.: 995,080

[22] Filed: Dec. 22, 1992

[51] Int. Cl.$^5$ ............................................. G01C 19/04
[52] U.S. Cl. ........................................ 74/5.5; 188/380
[58] Field of Search .................... 74/5.5, 574; 188/379, 188/380, 271

[56] References Cited

U.S. PATENT DOCUMENTS

| 2,226,902 | 12/1940 | Fischel | 74/5.5 |
| 2,534,963 | 12/1950 | Fowler | 188/379 X |
| 3,426,980 | 2/1969 | Caggiano et al. | |
| 3,442,468 | 5/1969 | Iorillo | |
| 3,523,458 | 8/1970 | Boothroyd | 74/5.5 |

FOREIGN PATENT DOCUMENTS 59-27215  2/1984  Japan .

*Primary Examiner*—Rodney H. Bonck
*Attorney, Agent, or Firm*—Finnegan, Henderson, Farabow, Garrett & Dunner

[57] ABSTRACT

A nutational motion damper includes a damping body positioned and constrained by springs to slide on a guide plate having a surface oriented substantially perpendicular to the axis of rotation of a gyroscopic body by opposed spring members. The guide plate is attached to a relatively non-rotating body coupled to the rotating gyroscopic body to follow nutational motion. The springs define a rest position for the damping mass on the axis of rotation and also urge the damping body against the guide plate.

13 Claims, 2 Drawing Sheets

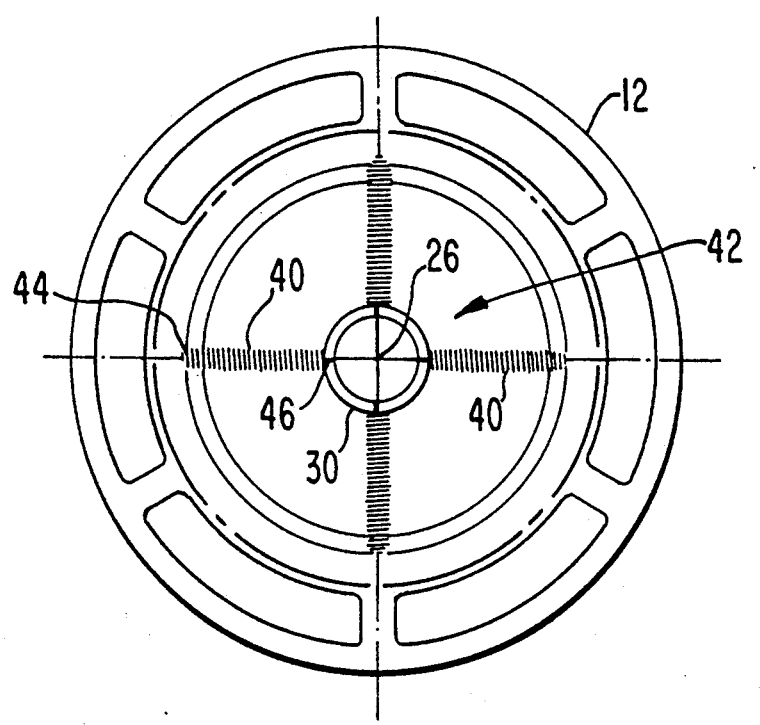

GYRO NUTATION DAMPER

This invention was made with U.S. Government support under Contract No. DAAH01-90-C-0323 awarded by the U.S. Army.

BACKGROUND

1. Field of the Invention

The present invention relates to apparatus for damping the nutational motion of a rotating body and, in particular, to apparatus for damping nutational motion by dissipating kinetic energy of that motion.

2. Description of the Prior Art

"Spin stabilization" of vehicles and instruments using a rotating, gyroscopic body is a well known and understood technique having a variety of applications. Spin stabilization has been used to control spacecraft as well as instruments such as sensing or navigational instruments on board moving aircraft and missiles.

Also understood by the prior art is the need to damp nutational motion of the gyroscopic body, that is, the natural oscillatory motion of the axis of rotation in response to transient disturbances. Such disturbances occur as a result of torques applied to the gyroscopic body about axes orthogonal to the axis of rotation. These torques can result from control elements or movements imparted by the vehicle or stabilized instrument.

U.S. Pat. No. 3,426,980 to Caggiano et al. and U.S. Pat. No. 3,442,468 to Iorillo are representative of prior art applications of a spin stabilization apparatus having mean for damping nutational motion. Caggiano et al. disclose a damping device having a damping mass element suspended in a sealed casing and surrounded by damping liquid. See FIGS. 1 and 2 of Caggiano et al. The kinetic energy incident to the nutational motion is converted to heat in the damping fluid. See col. 2, lines 44–47. In Caggiano et al., the spring constants are chosen to provide a "tuned" damper having a damped natural frequency near the nutational frequency of the gyroscopic body. Iorillo discloses a similar damper device having a damping mass suspended in a viscous liquid by tension springs. The device is mounted to a relatively non-rotating, "despun" body which is coupled to the rotating, gyroscopic body. See FIGS. 1 and 6 of Iorillo.

Problems inherent to a liquid-based damping apparatus include those attendant to containing a liquid in a sealed environment subject to changing external conditions of pressure, temperature, etc. Also, particular applications for a nutational damping apparatus may make difficult or even prohibit the use of devices which depend upon the viscosity of a liquid to achieve kinetic nutational energy dissipation. For example, missile infrared or microwave sensor units are often spin stabilized by a gyroscopic body and must operate under extreme conditions of acceleration, dynamic loading, etc. These conditions can aggravate fluid seals, promote leakage of the damping liquid, and lead to diminished effectiveness of the apparatus. Moreover, certain liquids such as the mercury-thallium mix used in conventional damping apparatus can be extremely toxic, posing environmental health concerns to personnel during manufacture of the apparatus or during storage of the unit.

SUMMARY OF THE INVENTION

It is therefore an object of the present invention to provide an apparatus for damping nutational motion of a rotating body which does not use or rely upon liquid damping materials.

It is also an object of the present invention to provide an apparatus for damping nutational motion having a relatively inexpensive construction which will nonetheless allow effective damping of rotational bodies.

It is still a further, particular object of the present invention to provide an apparatus for damping gyroscopically stabilized sensor units for missiles, which apparatus can withstand severe operating conditions attendant to missile applications while allowing effective damping of nutational motion of the sensor unit.

In accordance with the present invention, as embodied and broadly described herein, the apparatus for damping nutational motion of a body having a rotating portion subject to nutational motion and a non-rotating portion coupled to the rotating portion and responsive to the nutational motion, with the rotating body portion defining an axis of rotation, comprises a movable damping body having an exposed surface, and a guide member having a surface contacting the damping body surface. The guide member is attached to the non-rotating body portion and the guide member surface is oriented to constrain the movement of the movable damping body member to directions substantially perpendicular to the axis of rotation The apparatus further comprises means including elastic elements operatively connected between the non-rotating body portion and the damping body for restoring the damping body to a rest position on the guide member surface following relative movement of the damping body away from the rest position as a result of nutational motion or other disturbance. The apparatus still further includes friction means responsive to relative movement between said damping body for providing dissipation of the inertial energy imparted to the damping body and the non-rotating body portion by the nutational motion.

Preferably, the restoring means further comprises means for urging the damping body surface against the guide member surface, to maintain contact between these surfaces and to enhance the coefficient of friction during relative movement therebetween.

It is further preferred that the elements include spring members, and wherein the spring members are coiled tension springs with at least the coils adjacent the connections to the non-rotating body portion frictionally engaging the guide member during elongation and contraction of the coiled springs during relative movement between the damping body and guide member.

And it is still further preferred that the elastic elements are connected to the non-rotating body portion at a position whereby a resultant spring force exists on the damping body in a direction normal to and against the guide member.

BRIEF DESCRIPTION OF THE DRAWINGS

The accompanying drawings, which are incorporated in and constituted a part of the specification, illustrated a preferred embodiment of the invention, and together with the description, serve to explain the principles of the invention.

Of the drawings:

FIG. 2 an end view of the sensor unit shown in FIG. 1.

Figure 1:
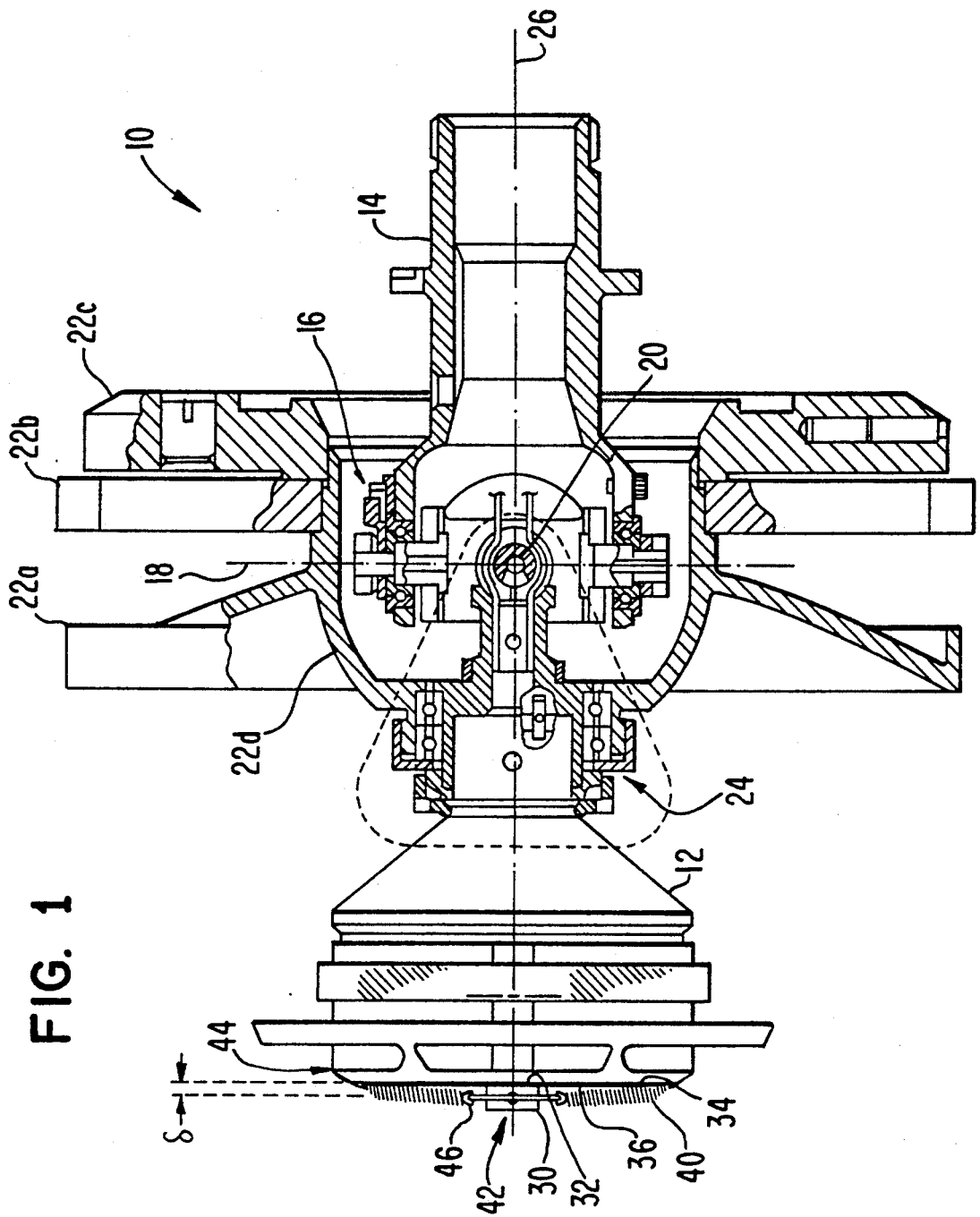
FIG. 1 is a cross-sectional side view of a spin-stabilized sensor unit for a missile employing nutational damping apparatus made in accordance with the present invention.

Reference will now be made to the present preferred embodiment of the invention which is illustrated in the above-described drawings.

DESCRIPTION OF THE PREFERRED EMBODIMENT

With initial reference to FIG. 1, there is shown in cross section a sensor unit 10 for a missile, which sensor unit includes an apparatus made in accordance with the present invention for damping nutation motion. As depicted, sensor unit 10 includes detector housing 12 which is coupled by gimbal assembly 16 to missile frame element 14. In addition to a detector element e.g., infrared, microwave, etc. (not shown), detector housing 12 can include a preamp element (also not shown) for amplifying signals from the detector element. As is shown in FIG. 1, coupling assembly 16 is a universal joint-type assembly permitting limited pivoting of detector housing 12 about orthogonal axes 18, 20, hereinafter referred to as the yaw and pitch axes, respectively. Positioned to surround coupling assembly 16 is a gyroscopic body 22. Gyroscopic body 22 is mounted for rotation on detector housing 12 by bearing assembly 24. As would be well understood by one of ordinary skill in the art, gyroscopic body 22 is intended to be rotatably driven by a drive means (not shown) about rotation axis 26 which is nominally coincident with the longitudinal axis of the missile.

In the FIG. 1 embodiment, gyroscopic body 22 is composed primarily of three annular mass elements 22a, 22b and 22c together with mounting hub 22d. The distribution of these masses is such as to maximize the inertial moment about rotational axis 26. However, other mass configurations and distributions can be utilized for gyroscopic body 22. As a result of the above construction, detector housing 12 does not rotate with the gyroscopic body 22 but is coupled to follow any motions of body 22 about axes 18, 20. As such, detector housing 12 experiences any unwanted nutational motions described by gyroscopic body 22.

In accordance with the present invention, an apparatus is provided for damping nutational motion of the rotating gyroscopic body. The damping means includes a movable damping body having an exposed surface and a guide member having a surface opposing and contacting the damping body exposed surface. Further, the guide member is fixed to the non-rotating body with the guide member surface being oriented to constrain movement of the damping body to directions substantially perpendicular to the axis of rotation of the rotating gyroscopic body.

As embodied herein, with continued reference to FIG. 1, the apparatus includes damping body 30 having exposed surface 32. The apparatus further includes guide plate 34 having surface 36 opposing and contacting damping body surface 32. Guide plate 34 is part of the detector housing 12 in the depicted embodiment, is oriented perpendicular to the axis of rotation 26, and serves to constrain the motion of movable damping body 30 by providing a surface (guide surface 36) along which damping body 30 can slide.

As is shown in FIG. 2, damping body 30 is essentially cylindrical (solid) in shape with an axial end surface comprising damping body exposed surface 32. Damping body 30 has a mass of about 0.75 gm compared to a combined mass of about 425 gm for the detector housing 12 and gyroscopic body 22. Damping body 30 has a diameter of 1.04 cm, a thickness of 0.24 cm, and was constructed of 316 CRES steel. Damping body surface 32 was finished to a roughness of 16. Guide plate 34 was constructed of CRES steel and guide plate surface 36 had a roughness of 32. While other materials could have been used, the above materials gave desired frictional characteristics, as will be discussed in more detail hereinafter.

Further in accordance with the present invention, means including elastic elements operatively connected between the damping body and the non-rotating body are provided for restoring the damping body to a rest position on the guide member surface following relative movement of the damping body away from the rest position as a result of nutational motion-induced inertial forces. As embodied herein, and with reference to FIG. 2, restoring means includes spring members 40 which are coiled tension springs interconnecting damping body 30 with detector housing 12. In the depicted embodiment, a total of four spring members 40 are provided in opposed pairs aligned in orthogonal directions parallel to the pitch and yaw axes 18, 20. Spring members 40 are constructed and mounted such that the static equilibrium forces act to position damping body 30 at a desired rest position (designated 42 in FIGS. 1 and 2) which, for the depicted embodiment, is centered on the rotational axis 26. However, it is possible to use a greater or fewer number of elastic elements to achieve the restoring function, such as three spring members positioned around the damping body at 120° angular intervals (not shown).

In the depicted missile sensor application, spring members 40 were each approximately 1.11 cm in length (unextended), had a spring constant of approximately 64 gm/cm, and were mounted with a tensile preload of about 20 gm. Because of the particular application, the spring material chosen was 302 CRES steel conforming to an appropriate MIL specification. Other materials could be used and may be preferred for other applications, as will be discussed henceforth.

Preferably, damping body 30 and spring members 40 are chosen such that the resultant spring mass system is "tuned", that is, has a resonant frequency at or near that of the expected nutation motion of the gyroscopic body. The resulting spring mass system would, as a consequence, experience comparatively larger excursions from the rest position relative to an "untuned" spring mass system, due to the -enhanced transfer of inertial energy from the gyroscopic body to the damper body in a tuned system. A tuned system, therefore, can provide greater inertial energy dissipation via friction for a given nutation period, and thus provide greater damping. However, an untuned spring mass system can be utilized in an apparatus according to the present invention. In designing a tuned spring-mass system, the effect of damping and also the influence of the mass imparted by the elastic elements on the calculated resonant frequency may have to be taken into account to provide the desired match between the spring-mass system frequency and the gyroscopic body nutational frequency. One skilled in the art could readily accomplish the required calculations.

Still further in accordance with the present invention, friction means responsive to relative movement between the damping body and the guide member are provided for dissipating the inertial energy imparted to the damping body and the non-rotating body by the nutational motion. As embodied herein, frictional means includes damping body surface 32 and opposing guide member surface 36 which materials and surface finishes were selected to provide a high coefficient of friction. The 302 CRES steel and 316 CRES steel materials used in the depicted missile sensor unit provide a coefficient friction of about 0.17. In other embodiments, the frictional materials can be used to form only portions of the respective opposing damping body surface and guide member surface.

Also, as embodied herein, the point of connection of spring members 40 to damping body 30 is spaced along the axis of rotation 26 relative to the connection points on detector housing 12. See FIG. 1. A spacing δ is depicted between the axial position of the connection points 44 of spring members 40 and housing 12 as well as between the connection points 46 of spring member 40 and damping body 30. This arrangement results in a force component on damping body 12 normal to and directed against guide surface 36. The magnitude of this force is approximately 4 gm in the disclosed embodiment.

It is believed that over 80% of the damping provided by the depicted apparatus occurs due to frictional engagement between damping body surface 32 and the guide plate surface 36, with the balance occurring due to internal energy dissipation of the material of spring members 40 and frictional engagement between the coils of spring members 40 and guide plate 34 near the points of connection. See FIG. 1. Alternatively, it may be preferred to select materials for the elastic elements such as spring members 40 to provide a greater percentage of energy dissipation. Moreover, it may be preferred to select materials for the elastic elements such that they provide the dominant (>50%) component of energy dissipation. For example, polymeric materials while having relatively high internal energy dissipation relative to a coiled metal spring, such as materials used in common "rubber bands," can exhibit sufficient restoring forces to function as the elastic elements in the apparatus of the present invention. As a further alternative, it may be preferred to mount the elastic members such as spring members 40 to further accentuate or further decrease the frictional dissipation contribution resulting from the relative motion between the elastic members and the guide member. While making the system "less damped," decreasing this contribution may be desired to provide better control over the dynamics of the spring-mass system and also to achieve consistency in the level of damping during operation.

It will be apparent to those skilled in the art that various modifications and variations can be made in the above-described apparatus for damping nutational motion without departing from the scope or spirit of the present invention. Thus, it is intended that the present invention cover such modifications and variations provided they come within the scope of the appended claims and their equivalence.

What is claimed is:

1. An apparatus for damping nutational motion of a body, the body having a rotating portion subject to nutational motion and a non-rotating portion coupled to the rotating portion and responsive to nutational motion, the rotating body portion defining an axis of rotation, the apparatus comprising:

a movable damping body having an exposed surface substantially perpendicular to the axis of rotation and a center on the axis of rotation;

a guide member having a surface contacting said exposed damping body surface, said guide member being attached to the non-rotating body portion, and said guide member surface being oriented to constrain the movement of said movable damping body in directions substantially perpendicular to the axis of rotation;

elastic elements operatively connected between the non-rotating body portion and said damping body for restoring said damping body to a rest position on said guide member surface following relative movement of said damping body away from said rest position as a result of nutational, motion-induced forces; and friction means, responsive to relative movement between said exposed damping body surface and said guide member surface, for providing dissipation of the inertial energy imparted to said damping body and said non-rotating body portion by nutational motion.

2. The apparatus as in claim 1 wherein said friction means includes said elastic elements being formed from materials having high internal friction characteristics.

3. The apparatus as in claim 1 wherein said friction means includes said elastic elements and further comprising means for urging said exposed damping body surface against said guide member surface.

4. The apparatus as in claim 3 wherein said friction means also includes said elastic elements being formed from materials having high internal friction characteristics.

5. The apparatus as in claim 1 wherein said guide member is a structural part of the non-rotating body portion.

6. The apparatus as in claim 1 wherein said elastic elements include four spring members arranged in opposed pairs in directions mutually orthogonal relative to one another and to the axis of rotation.

7. The apparatus as in claim 1 wherein said elastic elements are coiled tension springs, and wherein at least the coils adjacent the connections to said non-rotating body portion frictionally engage said guide member during elongation and contraction of said coiled springs during relative movement between said exposed damping body surface and said guide member surface.

8. The apparatus as in claim 3 wherein said elastic elements are connected to said non-rotating body portion at a position whereby a resultant spring force exists on said damping body in a direction normal to and against said guide member.

9. The apparatus as in claim 1 wherein said elastic elements have a spring constant and, together with said damping body, define a spring-mass system having a natural frequency near the frequency of nutational motion of the rotating body portion.

10. The apparatus as in claim 1 wherein said exposed damping body surface and said guide member surface are formed from CRES steel.

11. Apparatus for damping nutational motion of a gyroscopically stabilized sensing unit for a missile, the unit including a rotating gyroscopic body and a non-rotating housing coupled to follow pitch and yaw movements of the rotating gyroscopic body, the rotating gyroscopic body defining an axis of rotation, the apparatus comprising:

a movable damping body having an exposed surface substantially perpendicular to the axis of rotation and a center on the axis of rotation;

a housing surface contacting said exposed damping body surface and being oriented to constrain the movement of said movable damping body in directions substantially perpendicular to the axis of rotation;

elastic elements operatively connected between the non-rotating housing and said damping body for restoring said damping body to a rest position on said housing surface following relative movement of said damping body away from said rest position as a result of nutational, motion-induced forces; and friction means, responsive to relative movement between said exposed damping body surface and said housing surface, for dissipating inertial energy imparted to said damping body and said non-rotating housing by nutational motion.

12. The apparatus of claim 11 wherein said friction means includes said elastic elements and further comprising means for urging said exposed damping body surface against said housing surface.

13. An apparatus for damping nutational motion of a body, the body having a rotating portion subject to nutational motion and a non-rotating portion coupled to the rotating portion and responsive to the nutational motion, the rotating body portion defining an axis of rotation, the apparatus comprising:

a movable damping body having an exposed surface;

a guide member having a surface contacting said damping body surface, said guide member being attached to the non-rotating body portion, and said guide member surface being oriented to constrain the movement of said movable damping body in directions substantially perpendicular to the axis of rotation;

means including elastic elements operatively connected between the non-rotating body portion and said damping body for restoring said damping body to a rest position on said guide member surface following relative movement of said damping body away from said rest position as a result of nutational motion-induced forces; and friction means responsive to relative movement between said damping body and said guide member for providing dissipation of the inertial energy imparted to said damping body and said non-rotating body portion by the nutational motion;

wherein said elastic elements are coiled tension springs, and wherein at least the coils adjacent the connections to said non-rotating body portion frictionally engage said guide member during elongation and contraction of said coiled springs during relative movement between said damping body and said guide member.

* * * * *